March 6, 1945.    C. MAREK    2,370,981
ORCHARD COVER CROP IMPLEMENT
Filed Aug. 4, 1942    2 Sheets-Sheet 1

Inventor
Charles Marek
By Lyon & Lyon
Attorneys

March 6, 1945. C. MAREK 2,370,981
ORCHARD COVER CROP IMPLEMENT
Filed Aug. 4, 1942 2 Sheets-Sheet 2
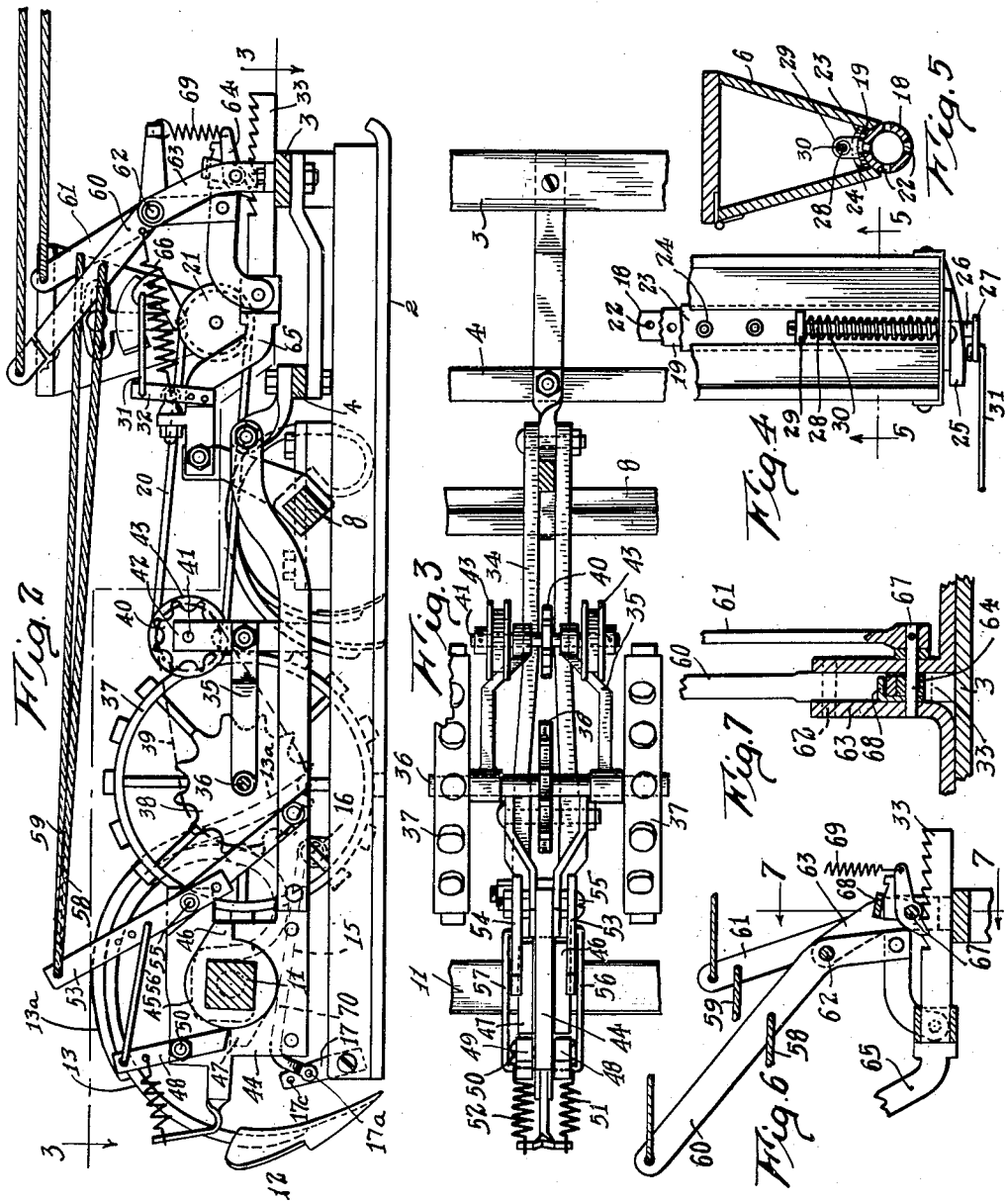
Inventor
Charles Marek
By Lyon & Lyon
Attorneys Patented Mar. 6, 1945

2,370,981

UNITED STATES PATENT OFFICE 2,370,981

ORCHARD COVER CROP IMPLEMENT

Charles Marek, Piru, Calif.

Application August 4, 1942, Serial No. 453,502

1 Claim. (Cl. 111—52)

This invention relates to orchard cover crop implements and more particularly to an implement applicable for use in the cultivation, seeding and furrowing of an orchard.

In the maintenance and care of an orchard, particularly citrus and like fruit orchards, it is common practice to plant between the trees certain grasses commonly designated as "cover crop." This "cover crop" is permitted to grow even while the orchard is being irrigated. After the cover crop is grown it is usually plowed into the soil.

It is an object of this invention to provide an implement particularly applicable for the cultivation, planting and furrowing of an orchard.

Another object of this invention is to provide an implement including a seed distributing means, cultivating means, and a furrow-forming means, all applicable for simultaneous operation for the purpose of seeding, cultivating and furrowing an orchard.

Other objects and advantages of this invention it is believed will be apparent from the following detailed description of a preferred embodiment thereof as illustrated in the accompanying drawings.

In the drawings:

Figure 2 is a sectional side elevation taken substantially on the line 2—2 of Figure 1.

Figure 3 is a fragmental sectional plan view taken substantially on the line 3—3 of Figure 2 of the control draft bar embodied in my invention.

Figure 4 is a fragmental plan of the seeder mechanism embodied in my invention.

Figure 5 is a sectional end view taken substantially on the line 5—5 of Figure 4.

Figure 6 is a fragmental sectional elevation taken on the line 6—6 of Figure 1.

Figure 7 is a fragmental sectional view taken substantially on the line 7—7 of Figure 6.

Figure 1:
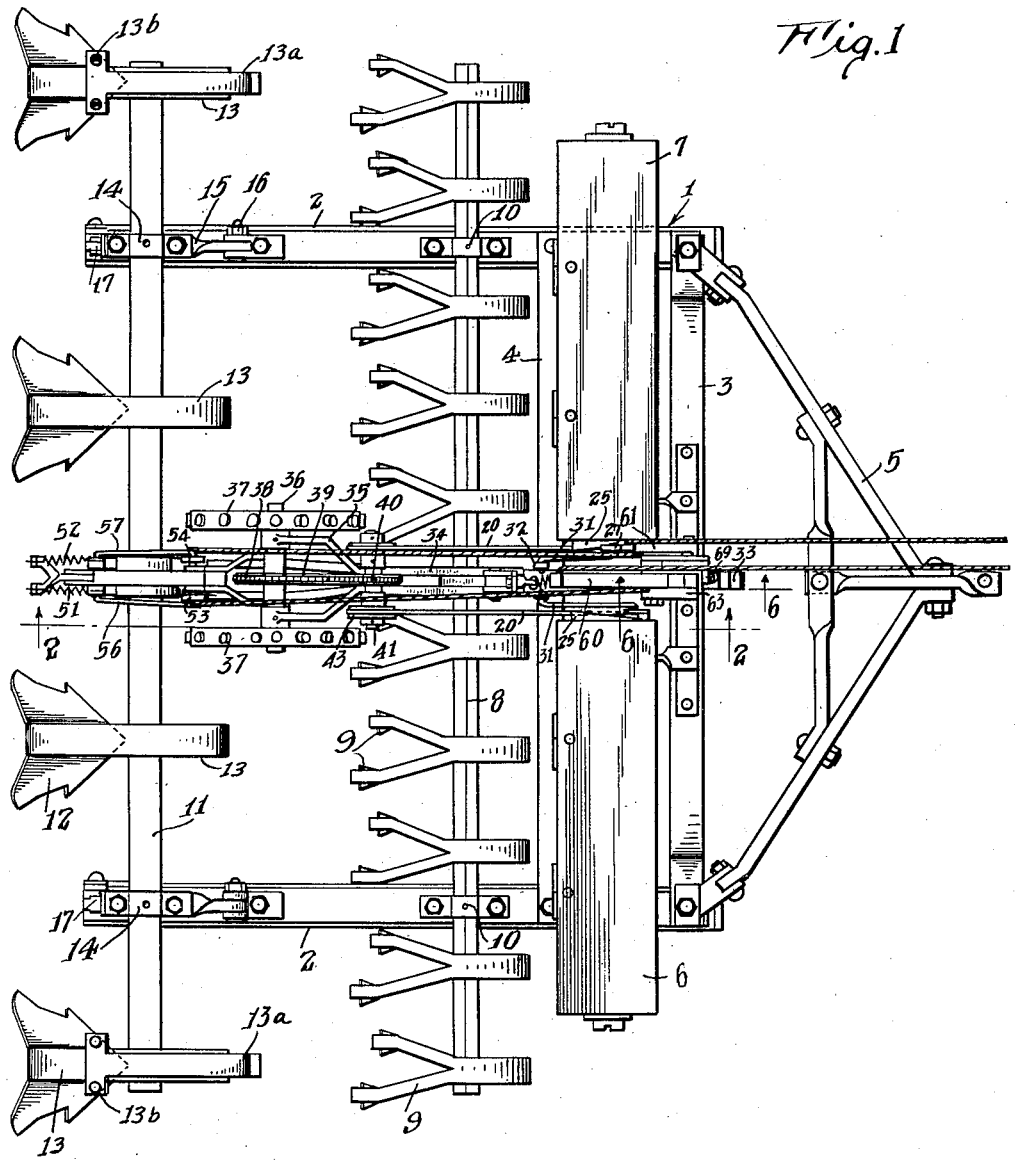
Figure 1 is a plan view of an implement embodying my invention.

In the preferred embodiment of my invention illustrated in the accompanying drawings, 1 indicates a frame which includes a pair of spaced runners 2 connected together by means of laterals 3 and 4. Connected to the frame 1 is a hitch 5 which may be of any suitable or desirable construction. Mounted on the frame 1 and of any suitable or desirable construction are seed boxes 6 and 7. Spaced on the frame 1 to the rear of the seed boxes 6 and 7 is a cultivator shaft 8 upon which cultivator points 9 are spaced. The shaft 8 is journaled in bearings 10 upon the frame 1. This permits the cultivator points to be moved into and out of cultivating position, which means will hereinafter be described. Positioned upon the frame 1 to the rear of the cultivator shaft 8 is a furrower-supporting shaft 11 carrying a suitable number of furrow shovels 12 upon carriers 13. The shaft 11 is journaled in bearings 14 carried on bearing brackets 15 pivoted to the runners 2 as indicated at 16. The rear extensions of the brackets 15 are pivoted to links 17 at 17a, and these links are pivoted at 17b to the runners 2 to limit the pivoting movement of the brackets 15 when the furrowing shovels 12 are moved to position to form furrows. Suitable means are provided for the control of the furrowing shovels 12, which means may be of any suitable construction as hereinafter set forth.

The carriers 13 as illustrated in Fig. 1, are four in number to correspond with the four furrowers 12, and the two outboard carriers 13 are provided with tumblers 13a. These tumblers overlie the curved bodies of the carriers or shanks 13 of the furrow shovels 12. One of these tumblers is shown in side elevation in Fig. 2 of the drawings, and in this view the forward portion of the tumbler is illustrated in dotted lines, projecting downwardly and forwardly from the forward portion of its carrier 13 when the shovels 12 are supported in the position illustrated in Fig. 2. These tumblers are preferably attached to their corresponding shovel shanks or carriers 13 by clamping bolts 13b (see Fig. 1).

Means are provided for distributing the seed from the seed boxes 6 and 7, which means may be of any suitable or desirable construction and are herein illustrated as including perforated distributor tubes 18 which are positioned under the perforated throat plate 19 and are adapted to be rotated by suitable means such, for example, as by the medium of a chain or belt 20 trained over a sprocket 21 mounted at the end of each tube 18. The tubes 18 are provided with a plurality of seed distributing apertures 22 through which the seeds fall. Mounted in the seed boxes 6 and 7 are closure plates 23 containing apertures 24 through which the seeds pass when the distributor plates 23 are moved so that their apertures 24 align with corresponding apertures formed in the plates 19.

Means are provided for actuating the closure plates 23 to and from closed position, which means may be of any suitable form and as herein illustrated, include cam plates 25 secured at the inner ends of the boxes 6 and 7 adapted to be engaged by cams 26 formed on levers 27. The levers 27 are secured upon connecting shafts 28 which are in turn secured to the ears 29 of the closure plates 23. A spring 30 normally urges the plates to the open position and is interposed between the end of the box and the ears 29.

The levers 27 are connected through the medium of rods 31 with arms 32 secured to a ratchet bar 33. The ratchet bar 33 provides the means for holding the respective units of my implement in the desired position.

Secured to the frame member 4 and to the shaft bar 11 is a central frame bar 34 upon which there is journaled a fork 35 carrying a wheel shaft 36 to which ground wheels 37 are secured. Secured to the shaft 36 is a sprocket 38 connected by means of a chain 39 to the sprocket 40 secured to a shaft 41 mounted in the standard 42 by which the fork 35 is journaled to the frame bar 34.

Secured to each end of the shaft 41 is a pulley 43 over which the belt or chain element 20 is trained. The ground wheels operate as the implement is progressed over the ground to turn the seed distributing tubes 18 of the seed boxes 6 and 7.

The frame bar 34 is secured to the shaft bar 11 in any suitable manner and is here illustrated as being secured to a plate 44 in which the bearing collar 45 is mounted. The shaft 11 is secured in position within the bearing collar 45 so that the bearing collar 45 turns with the shaft 11 and within the plate 44.

There is provided at the ends of the collar 45 a pair of discs, each disc having a lug, so that two diametrically opposed stop lugs 46 and 47 are presented, which are adapted to be engaged by the ends of lock levers 48 and 49, respectively, to hold the shaft bar 11 in the position to maintain the furrow shovels 12 either in operative or inoperative positions. The levers 48 and 49 are pivotally mounted on a pin 50 carried by the plate 44 and are urged into lug-engaging position by means of springs 51 and 52. Means are provided for actuating the levers 48 and 49, which means include a pair of actuating levers 53 and 54 journaled on a pin 55 secured to the forward end of the plate 44 and connected to the levers 53 and 54 by means of rods 56 and 57. The levers 53 and 54 are connected by means of flexible connecting members or ropes 58 and 59 with lock levers 60 and 61. The lock lever 60 is journaled on a pin 62 within a bifurcated bracket 63 supported on the forward frame member 3. The ratchet or lock bar 33 extends through the bifurcated bracket 63. A lock pawl 64 is carried upon the lower end of the lever 61 in position to be engaged with the ratchet teeth of the lock bar 33 to hold the lock bar in adjusted position. The lock bar 33 is at its rear end connected to an arm 65 secured to a cultivator shaft 8. Thus the degree of penetration of the cultivator points 9 may be determined by the tooth of the lock bar 33 within which the lock pawl 64 is engaged.

A tension spring 66 is connected between the lock lever 60 and the rear of the lock bar 33 and acts to urge the cultivator shaft 8 toward clockwise rotation or to position to move the cultivator points out of the ground.

It will be apparent from the foregoing that the lock lever 60 performs the dual function of sliding the lock bar 33 under the lock pawl 64 and of actuating the lock lever 48 to move the lock lever 48 either to or from lug-engaging position. The lug 46 engaged by the lever 48 holds the shaft 11 from rotation in a clockwise direction, thereby maintaining the furrowers 12 out of ground-engaging position, that is to say, located in an elevated position and disposed forward of the shaft 11.

In the position of the shovels 12 illustrated in Fig. 2, the lock lever 49 which is located back of the lock lever 48, is in engagement with the lug or tooth 47, and this lock lever resists the thrust of the ground against the shovels 12 as the implement is pulled forward. By releasing this lock lever 49, the drag of the earth on the shovels 12 will push them up sufficiently to enable the tumblers 13a to strike the ground, and the drag on these tumblers will then continue this clockwise rotation of the shaft 11 until the lug or tooth 46 comes in contact with the lock lever 48, and this will support the shovels 12 in their inoperative position referred to above, in which they will be disposed in a position forward of the shaft 11. When it is desired to return the furrower shovels 12 to their operative position, it is merely necessary to release the lock lever 48, whereupon the shovels will swing down to the ground, and as the implement is pulled forward, these shovels will swing back and rotate the shaft 11 until their backward swinging movement is arrested by the lock lever 47, which will hold the shovels again in the position in which they are shown in Fig. 2.

The lock lever 61 provides the means for releasing the lock pawl 64 and for actuating the lock lever 49 to move the same out of the path of the lug 47. The lug 47 provides the stop lug for holding the furrow points or shovels 12 in operative or ground-engaging position. The lock lever 61 is secured to a pin 67 journaled in a bifurcated standard 63. Secured to the pin 67 is a latch-releasing arm 68 adapted to engage the rear end of latch pawl 64 to force the same against the pressure exerted by the spring 69 and to position out of engagement with the teeth of the lock bar 33.

It will be apparent from the foregoing that when the lock bar 33 travels forwardly as viewed in Figure 2 through the bifurcated standard 63, that it moves the arms 32 forward, thereby imparting a forward thrust through the rods 31 to rotate the cams 26 against the cam plates 25, thereby overcoming the force of the spring 30 and moving the closure plates 23 to the open position within the bottom of the seed boxes 6 and 7.

In order to provide for an adjustment of the depth of the furrowing shovels 12, the bearings supporting the furrowing shaft 11 that are supported upon the brackets 15, and which are pivotally secured to the runners 2. In order to effect vertical adjustment of the rear ends of the runners 2 with respect to the other mechanism of this implement, the aforesaid links 17 (see Fig. 2) are formed with a plurality of bolt openings 17c to receive a bolt 17a that attaches the rear end of the bracket 15 to each link 17.

Having fully described my invention, it is to be understood that I do not wish to be limited to the details herein set forth, but my invention is of the full scope of the appended claim.

I claim:

In a cover crop device, the combination of a pair of spaced runners, a hitch secured to the forward end of the runners, a seeding mechanism supported upon the runners for distributing seed, cultivator means carried by the runners to the rear of the seeding mechanism for covering the seeds spread by the seeding mechanism, a furrowing means including a plurality of furrowing shovels mounted upon the rear of the runners and upon which the furrowing shovels are spaced laterally to form a plurality of furrows in the seeded ground as formed by the seeding mechanism and cultivating means, ground wheel means carried by the runners for driving the seeding mechanism, mechanism for raising the cultivator means to non-cultivating position, and means interconnected between the cultivator raising mechanism and the seeding mechanism for discontinuing the operation of the seeding mechanism when the cultivator mechanism is raised, means for raising the furrowing shovels from ground-engaging position, and means interconnected between the cultivator raising means and the furrowing means for holding the furrowing shovels in ground-engaging position when the cultivator means is in cultivating position.

CHARLES MAREK.